T. ECK & O. CATHCART.
WATER METER.
APPLICATION FILED AUG. 31, 1915.
1,280,689. Patented Oct. 8, 1918.
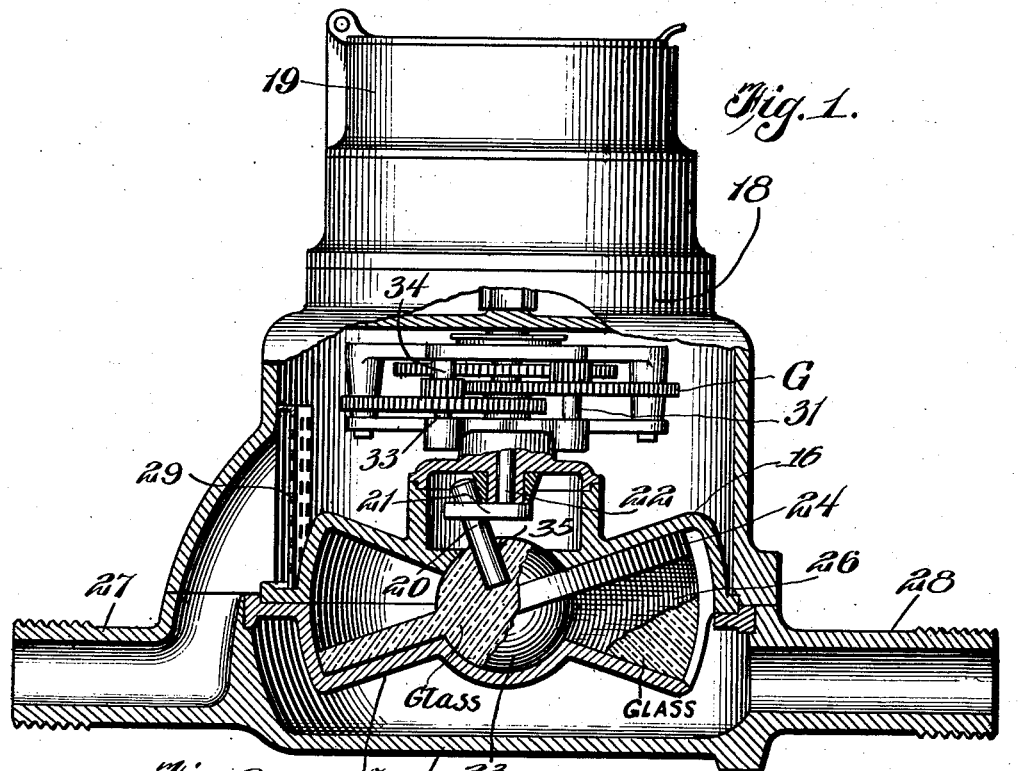
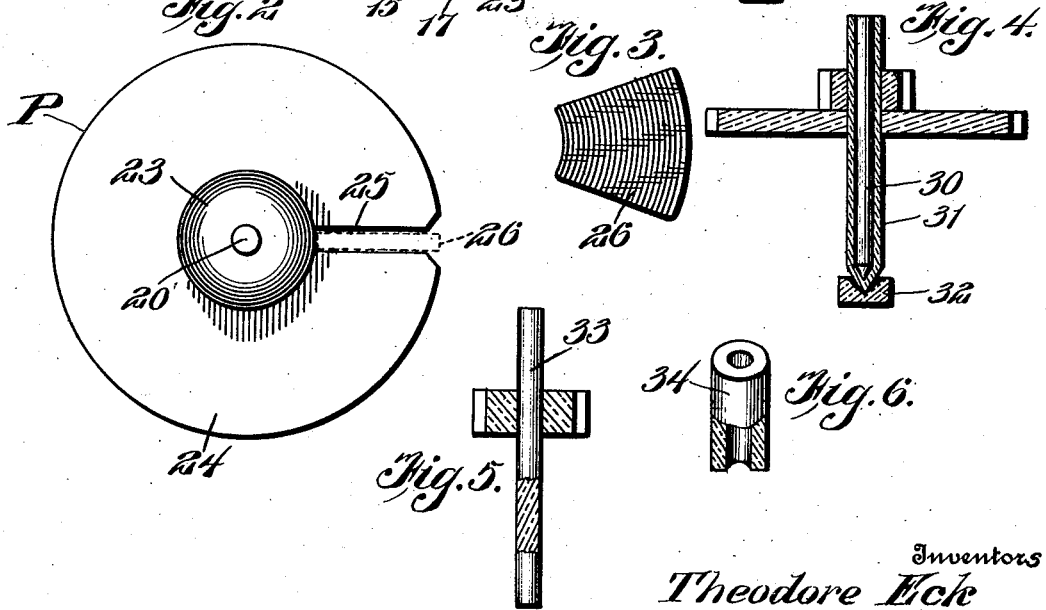
Inventors
Theodore Eck
Orie Cathcart

UNITED STATES PATENT OFFICE.

THEODORE ECK AND ORIE CATHCART, OF MULVANE, KANSAS.

WATER-METER.

1,280,689. Specification of Letters Patent. Patented Oct. 8, 1918.

Application filed August 31, 1915. Serial No. 48,274.

*To all whom it may concern:*

Be it known that we, THEODORE ECK and ORIE CATHCART, citizens of the United States, residing at Mulvane, in the county of Sumner and State of Kansas, have invented new and useful Improvements in Water-Meters, of which the following is a specification.

This invention relates to water meters, and it has particular reference to that type of water meters that is provided with a nutating piston.

Makers of water meters have long been confronted with the difficulty that the working parts of the meter which are utilized for actuating the registering device and which are necessarily at all times in contact with water have been liable to corrosion and consequent deterioration, materially shortening the life of the meter. These working parts have usually been made of metal, although other materials have been experimented with. No success, however, has heretofore, so far as we are aware, attended these efforts owing to the difficulty of obtaining material of the requisite hardness, wear resisting qualities, ability to resist corrosion, and of proper specific gravity to operate successfully.

The parts of the meter which have been particularly affected are the disk or piston and the disk chamber abutment, sometimes known as the diaphragm. The train of gears utilized for transmitting motion from the piston to the registering device usually lasts a long time and is able to resist hard usage, especially when made of metal such as bronze or some similar alloy, but some of the bearings and the spindles which have been subject to hard wear have been found to deteriorate in from one to two years' time to such an extent as to render the meter and the registration thereof inaccurate.

We have discovered that the piston and the abutment coöperating therewith may be successfully made of glass, this material possessing the requisite wear-proof qualities as well as the ability to resist corrosion and being of suitable specific gravity, in addition to which we find that the water acts as a lubricant for the glass, making the operation of the piston and the abutment practically frictionless. In like manner we find that some of the gear carrying spindles may be advantageously provided with glass ferrules and that glass bearings or jewels may be advantageously provided at many parts of the meter.

Our invention may, therefore, be said to consist in the production of a water meter having working parts made of glass, the said working parts consisting particularly of the piston and the abutment and also of such other parts as will be hereinafter designated and described, reference being had to the accompanying drawing, in which,—

Figure 1 is a view in side elevation of a water meter, parts having been broken away for the purpose of exposing the interior construction.

Fig. 2 is a plan view of the piston detached.

Fig. 3 is a plan view of the disk chamber abutment detached.

Fig. 4 is a sectional detail view of a gear carrying shaft equipped with a glass ferrule, showing also the glass jewel or bearing for the same.

Fig. 5 is a sectional detail view showing a gear carrying system made of glass.

Fig. 6 is a perspective view of a bearing sleeve made of glass, parts having been broken away.

Corresponding parts in the several figures are denoted by like characters of reference.

15 and 16 designate, respectively, the lower and upper halves of the disk chamber, the same being contained within the casing of which 17 designates the lower portion and 18 the top portion. The registry box, shown at 19, contains the registering mechanism which is driven by a train of gears G initially actuated by the piston stem 20 engaging a crank 21 on the main shaft 22. The stem 20 is suitably connected with the piston P which is of the well known shape comprising a spherical body 23 having a circumferential flange 24 which is provided with a radial notch or recess 25 for the reception of the abutment 26. The entire piston, as well as the abutment, is made of glass, the piston being preferably molded, while the abutment may be cut from a sheet of glass of suitable dimensions and afterward ground so as to fit the disk chamber and the piston as snugly as may be desired. The customary inlet and outlet 27, 28 are provided as well as the strainer which is shown at 29.

One of the gear carrying stems or shafts 30 has been shown as being provided with a glass ferrule 31 for which a step or bearing 32 also made of glass is provided. Another gear carrying shaft 33 has been shown as being constructed of glass, and for this stem or shaft a sleeve or bearing 34 also made of glass is provided. These details are to be regarded as merely illustrative, and it is to be understood that wherever it may be found to be possible and desirable, glass is to be substituted for metal or other material in the construction of such parts as are exposed to the action of water.

In the mechanical construction of the meter no novelty is here claimed, it being understood that the invention in a general sense is applicable to the various forms of water meters now in use. A particular advantage of the invention resides in the fact that the essential parts, and especially the piston and the abutment, may be installed in meters now in use by substituting the same for the present parts at a very moderate expense. The piston stem 20 may be made of metal, and the spherical portion 23 of the piston has been shown as being formed with a socket 35 for the reception of said stem.

Having thus described the invention, what is claimed as new, is:—

A water meter comprising a casing, a piston therein formed of glass and comprising a spherical body having a circumferential flange provided with a radial slot, an abutment also made of glass and snugly fitting the said slot and having its inner end provided with a curved recess to snugly engage the spherical body, and a stem made of metal connected with said spherical body.

In testimony whereof we affix our signatures.

THEODORE ECK.
ORIE CATHCART.